United States Patent
Gimenez Molinelli et al.

(10) Patent No.: US 10,246,003 B2
(45) Date of Patent: Apr. 2, 2019

(54) DETERMINATION AND SETTING OF OPTIMAL INTENSITY

(71) Applicant: International Business Machines Corporation, Armonk, NY (US)

(72) Inventors: Federico Tomas Gimenez Molinelli, Autonoma de Buenos Aires (AR); Nicolas Orlando Nappe, Buenos Aires (AR); Gaston Alejo Rius, Buenos Aires (AR); Nicolas Tcherechansky, Buenos Aires (AR); Facundo Javier Tomaselli, Autonoma de Buenos Aires (AR); Nicolas Mario Jose Torcasio, Autonoma de Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/465,846

(22) Filed: Mar. 22, 2017

(65) Prior Publication Data

US 2018/0272922 A1    Sep. 27, 2018

(51) Int. Cl.
*B60Q 1/14* (2006.01)
*G05B 15/02* (2006.01)
*B60Q 1/20* (2006.01)

(52) U.S. Cl.
CPC .............. *B60Q 1/143* (2013.01); *B60Q 1/20* (2013.01); *G05B 15/02* (2013.01); *B60Q 2300/054* (2013.01)

(58) Field of Classification Search
CPC . B60Q 1/06; B60Q 1/085; B60Q 1/46; B60Q 1/143; B60Q 5/005

USPC ........................................................ 315/77, 82
See application file for complete search history.

(56) References Cited

U.S. PATENT DOCUMENTS

| | | | |
|---|---|---|---|
| 7,920,250 B2 | 4/2011 | Robert et al. | |
| 7,944,362 B2 | 5/2011 | Hue et al. | |
| 8,045,760 B2 | 10/2011 | Stam et al. | |
| 8,425,092 B2* | 4/2013 | Kobayashi | B60Q 1/143 362/465 |
| 2004/0218401 A1* | 11/2004 | Okubo | B60Q 1/085 362/526 |
| 2007/0194720 A1* | 8/2007 | Inoue | H05B 39/047 315/209 R |
| 2010/0213846 A1* | 8/2010 | Thomas | G01S 13/88 315/82 |
| 2011/0006685 A1* | 1/2011 | Kraft | B60Q 1/1423 315/77 |
| 2014/0016335 A1* | 1/2014 | Cho | B60Q 1/06 362/466 |

(Continued)

FOREIGN PATENT DOCUMENTS

JP    2004500279 A    1/2004

*Primary Examiner* — Tung X Le
(74) *Attorney, Agent, or Firm* — George R. McGuire; Bond Schoeneck & King, PLLC; John Pivnichny

(57) ABSTRACT

Adjusting the intensity of the rear fog lights of a vehicle to optimize intensity based on the precipitation rate and the speed of the vehicle in order to increase the visibility of drivers of the following vehicles. The speed of the vehicle is detected with a speed sensor, a rain value is determined using a rain sensor, and the optimal light intensity is calculated taking into account vehicle specific turbulence characteristics. The rear fog lights are then modulated according to the optimal light intensity to maximize the visibility of the fog lights to any following vehicles.

6 Claims, 3 Drawing Sheets

(56) References Cited

U.S. PATENT DOCUMENTS

| | | | |
|---|---|---|---|
| 2015/0022331 A1* | 1/2015 | Huth | B60Q 5/005 340/425.5 |
| 2016/0009218 A1* | 1/2016 | Nakashima | B60Q 1/20 701/36 |
| 2016/0347236 A1* | 12/2016 | Yatsuda | B60Q 1/085 |

* cited by examiner

DETERMINATION AND SETTING OF OPTIMAL INTENSITY

BACKGROUND

The present invention relates to vehicular lighting systems and, more specifically, to modulation of the intensity of rear fog lights to improve visibility during rainy conditions.

During rainy conditions, the tires and aerodynamic characteristics of vehicle will produce a rearward spray. A light spray will often intensify the intensity of the rear fog lights of a vehicle, thereby causing a dazzle effect that can negatively impact the driver of any following vehicle. A heavy spray can have the opposite effect by obscuring the rear lights and making the lights virtually invisible to a driver in a following vehicle. This may also cause the driver the need to constantly have to turn fog lights on and off depending on the changing situations. Accordingly, there is a need in the art for a system that can that calculate the optimal intensity of the rear fog lights of a given vehicle according to the aerodynamic characteristics of the vehicle, the intensity of the precipitation, and the speed of the vehicle and that can adjust the intensity of the rear fog light accordingly.

SUMMARY

The invention calculates the optimal intensity of the rear fog lights of a given vehicle according to the aerodynamic characteristics of the vehicle, the intensity of the precipitation, and the speed of the vehicle and then can adjusts the intensity of the rear fog light accordingly. In one embodiment, the invention may be a system for modulating the intensity of illumination from a vehicle and includes a first sensor for detecting speed of the vehicle and outputting a signal representing the speed of the vehicle, a second sensor for detecting an amount of precipitation falling proximately to the vehicle and outputting a signal representing the amount of precipitation, at least one light driver for controlling a light that is positioned in the rear of the vehicle and will have an intensity when illuminated, and a controller coupled to the first sensor, the second sensor, and the light, wherein the controller is programmed to calculate an intensity value for the at least one light based on the speed received from the first sensor and the precipitation amount received from second sensor and is programmed to modulate the intensity of the at least one light according to the intensity value. The intensity may be calculated based on the speed of the vehicle as a fraction of a maximum speed of the vehicle times the amount of precipitation as a fraction of a maximum amount of precipitation. The intensity may be adjusted by a constant that represents vehicle specific aerodynamic characteristics.

In another embodiment, the invention may be a method of modulating the intensity of illumination from a vehicle. In one step, first sensor is used to detect a speed of a vehicle and outputting a corresponding speed signal. In another step, a second sensor is used to detect an amount of precipitation falling proximately to the vehicle and outputting a corresponding precipitation amount signal. In yet another step, an optimal light intensity is calculated based on the speed signal and the precipitation amount signal. Finally, a light positioned in a rear of the vehicle may be modulated to have an intensity corresponding to the calculated optimal light intensity. The optimal light intensity may calculated based on the speed of the vehicle as a fraction of a maximum speed of the vehicle times the amount of precipitation as a fraction of a maximum amount of precipitation. The optimal light intensity may be adjusted by a constant that represents specific aerodynamic characteristics of the vehicle.

DETAILED DESCRIPTION

Figure 1:
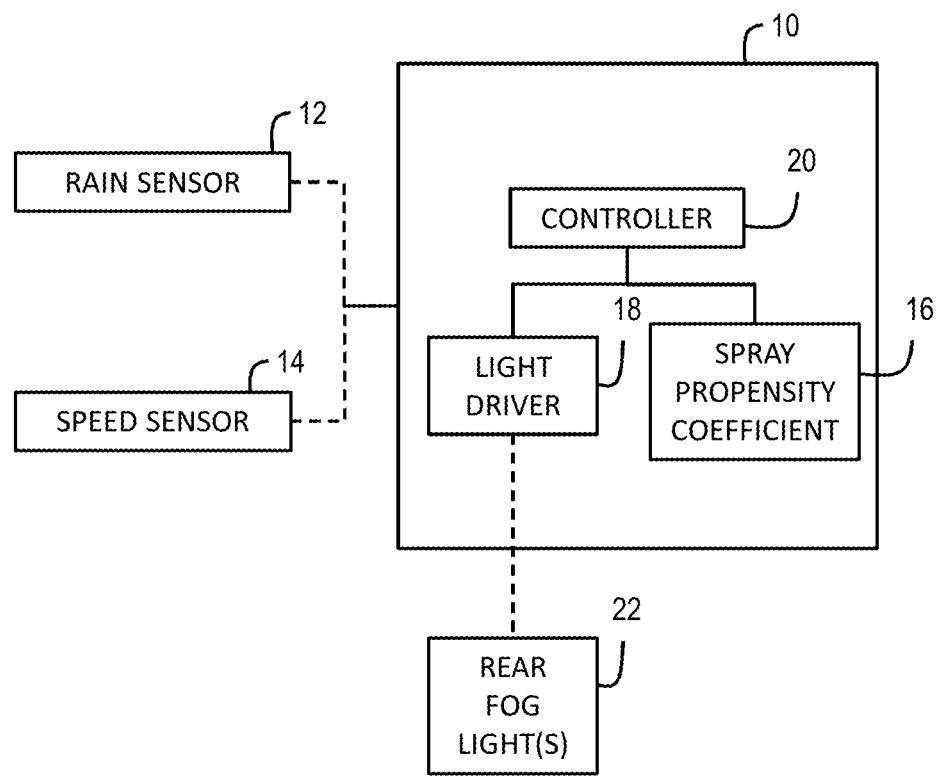
FIG. 1 is a schematic of a system for modulating the intensity of the rear fog lights of a vehicle according to current driving conditions.

Referring to the figures, wherein like numerals refer to like parts throughout, there is seen in FIG. 1 a rear fog light modulation system 10 that can calculates the optimal intensity for the rear fog lights of a vehicle (optional fog lights) based on the intensity of precipitation, such as rain, and the speed of the vehicle. System 10 may then modulate the intensity of the rear fog lights of the vehicle to maximize visibility and improve driving safety. As seen in FIG. 1, system 10 includes a rain sensor 12, a speed sensor 14, a spray propensity coefficient 16, and a rear fog light intensity control driver 18. System 10 may include a programmed element acting as a controller 20 for collecting data from rain sensor 12 and speed sensor 14, applying spray propensity coefficient 16 to a calculation of optimal light intensity, and then driving rear fog light intensity control driver 18 so one or more rear fog lights 22 coupled to driver 18 are modulated to the particular intensity determined by system 20 to be optimal.

Controller 20 may comprise a microcontroller or microprocessor, firmware or software running on a circuit, or even a discrete digital or analog circuit configured to perform the functions described herein. Spray propensity coefficient 16 is preferably programmed into controller 20 as a default for the particular vehicle. However, to the extent that system 10 may be provided as an after-market option, spray propensity coefficient 16 may be a configurable setting in system 10 so that a user may select a particular coefficient based on the make and model of vehicle. Rain sensor 12 may comprise a device that can perform accurate precipitation detection, such as conventional devices that use capacitive sensing via a sensor plate or via infrared or laser light to generate a corresponding analog or digital signal reflective of rain droplet detection. Speed sensor 14 may comprise a discrete device that independent determines the speed of the vehicle or an interaction to an on-board vehicle speed device, such as a conventional speedometer, or digital dashboard component.

System 10 is used to enable an automatic rain mode function for the rear fog lights. When automatic rain mode is selected, such as by a driver of the vehicle rotating a light setting dial or activating a switch, the rear fog lights are modulated to a preferred light intensity as determined by system 10. More specifically, using rain sensor 12, speed sensor 14, and spray propensity coefficient 16, system 10 calculates the optimal light intensity for the rear fog lights so that the drivers of any vehicles that are following the vehicle outfitted with system 10 will be able to see the rear fog lights adequately and without becoming dazzled due to over-brightness cause by weather conditions.

As an example, the preferred rear fog light intensity may be calculated using the following formula:

$$\text{Rear Fog Light Intensity} = (\text{Vehicle Speed/Maximum Speed})^{Vehicle\ Coefficient} * (\text{Vehicle Sensor Rain Value/Maximum Rain Value})^{Vehicle\ Coefficient}$$

Figure 2:
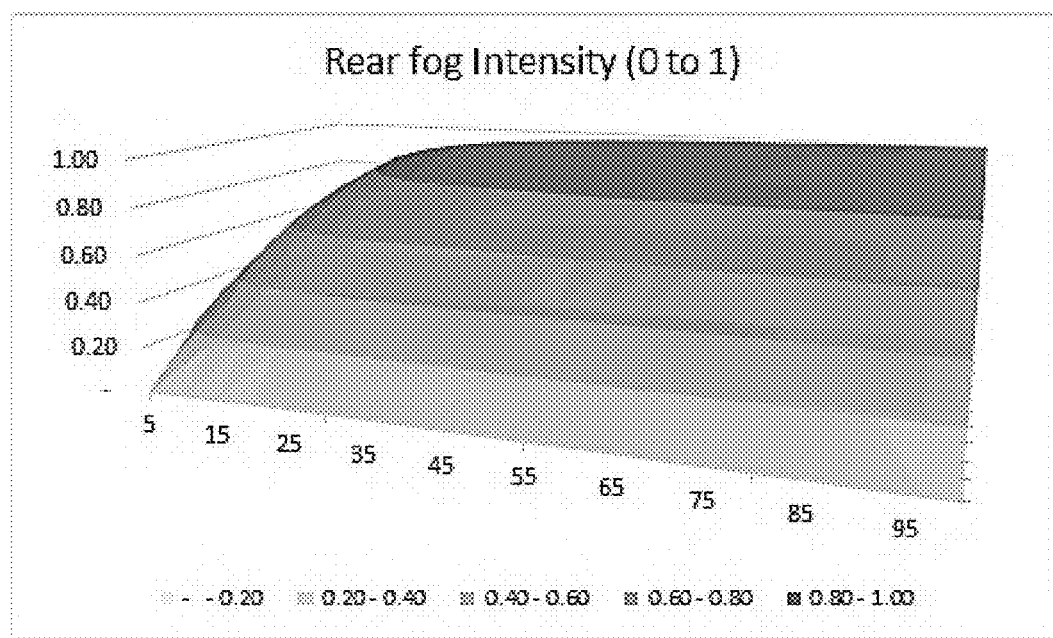
FIG. 2 is a graph of a rear fog light intensity curve for an exemplary vehicle.

For an exemplary vehicle with coefficient of 0.4 and a maximum speed of 200 (km/h or mph) and a rain sensor range from 0 to 1, the fog intensity curve would look like FIG. 2, where the x-axis is speed, the y-axis is rain, and the z-axis is intensity.

The vehicle coefficient represents a vehicle specific variable that adjusts the calculation based on the effect of speed and water on surface on the density of the spray that is particular to the model of the vehicle outfitted with system 10. For example, a sedan outfitted with system 10 may produce, on average, a different spray at the same precipitation rate and vehicle speed than a hatchback or station wagon. It should be recognized that similar formula may be used provided that they account for the fact that when rainfall becomes heavier, the water on the road surface increases so that spray density increases, thereby requiring an increase in the intensity of the rear fog lights. Rear fog light intensity may be modulated between a value of zero (zero or minimum intensity) to a value of one (maximum intensity) based on a rain value as calculated by system 10.

Figure 3:
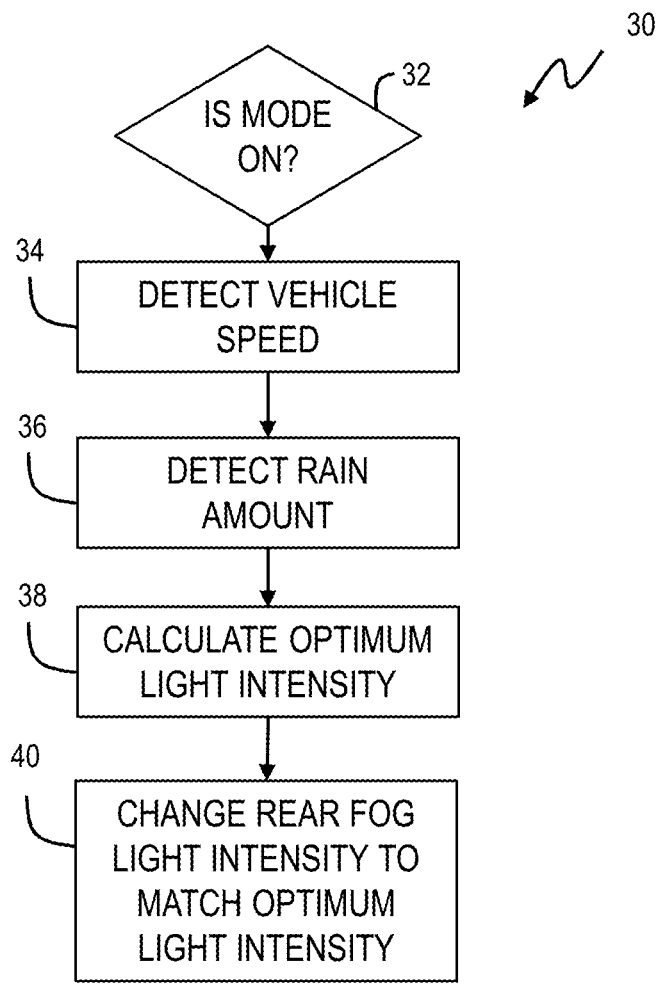
FIG. 3 is a flowchart of a process for modulating the intensity of the rear fog lights of a vehicle according to current driving conditions.

Referring to FIG. 3, system 10 may implement a light intensity control process 30 that begins with a check 32 to determine whether automatic rain mode has been turned on by a driver. If so, the vehicle speed is detected 34 using sensor 12. Next, precipitation amount is detected 36 using rain sensor 14. Controller 20 then calculates the optimal light intensity 38 including the use of any spray propensity coefficient 16 specific to the particular vehicle. Finally, controller 20 operates light driver 18 to cause the rear fog lights of the vehicle to be illuminated according to the optimal light intensity 40. Thus, light intensity changes will be applied in order to reduce effect of changes on spray.

The descriptions of the various embodiments of the present invention have been presented for the purposes of illustration, but are not intended to be exhaustive or limited to the embodiments disclosed. Many modification and variations will be apparent to those of ordinary skill in the art without departing from the scope and spirit of the described embodiments. The terminology used herein was chosen to best explain the principles of the embodiments, the practical application or technical improvement over the technologies found in the market place, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A fog light modulation system, comprising:
   a first sensor for detecting speed of said vehicle and outputting a signal representing said speed of said vehicle;
   a second sensor for detecting an amount of precipitation falling proximately to said vehicle and outputting a signal representing said amount of precipitation;
   a light driver for illuminating a light positioned in the rear of the vehicle to an intensity;
   a controller comprising a microcontroller coupled to said first sensor, said second sensor, and said light driver, wherein said microcontroller is programmed to include a series of spray propensity coefficients representing vehicle specific aerodynamic characteristics for a respective series of corresponding vehicles and to allow one of said series of spray propensity coefficients to be selected for adjusting said intensity;
   wherein said microcontroller is programmed to calculate an intensity value for said at least one light based on said speed received from said first sensor as a fraction of a maximum speed of said vehicle times said amount of precipitation received from second sensor as a fraction of a maximum amount of precipitation and to adjust said intensity value by the selected one of said series of spray propensity coefficients; and
   wherein said microcontroller is programmed to modulate said intensity of said at least one light according to said intensity value by controlling said light driver.

2. The system of claim 1, wherein the second sensor comprises a capacitive sensing plate.

3. A method of modulating the intensity of illumination of the fog lights a vehicle, comprising:
   using a first sensor to detect a speed of a vehicle and outputting a corresponding speed signal;
   using a second sensor to detect an amount of precipitation falling proximately to said vehicle and outputting a corresponding precipitation amount signal;
   calculating an optimal light intensity based on said speed signal and said precipitation amount signal, wherein said optimal light intensity is calculated based on said speed of said vehicle as a fraction of a maximum speed of said vehicle times said amount of precipitation as a fraction of a maximum amount of precipitation;
   selecting a spray propensity coefficient from a plurality of spray propensity coefficients, each of which corresponds to specific aerodynamic characteristics of a corresponding plurality of vehicles;
   adjusting said optimal light intensity by the selected spray propensity coefficient; and
   modulating a light positioned in a rear of said vehicle to have an intensity corresponding to said calculated optimal light intensity after a predetermined event.

4. The method of claim 3, wherein selecting said constant from a plurality of constants comprises allowing a user to select one of said spray propensity coefficients.

5. A vehicle having a fog light modulation system, comprising:
   a first sensor for detecting speed of a vehicle and outputting a signal representing said speed of said vehicle;
   a second sensor for detecting an amount of precipitation falling proximately to said vehicle and outputting a signal representing said amount of precipitation;
   at least one light positioned in the rear of said vehicle and having an intensity;
   a light driver operatively coupled to the at least one light and configured to adjust said intensity of said at least one light;
   a controller comprising a microcontroller coupled to said first sensor, said second sensor, and said light driver, wherein said microcontroller is programmed to include a series of spray propensity coefficients representing vehicle specific aerodynamic characteristics for a respective series of corresponding vehicles and to allow one of said series of spray propensity coefficients to be selected for adjusting said intensity;
   wherein said microcontroller is programmed to calculate an intensity value for said at least one light based on said speed received from said first sensor as a fraction of a maximum speed of said vehicle times said amount of precipitation received from second sensor as a fraction of a maximum amount of precipitation and to adjust said intensity value by the selected one of said series of spray propensity coefficients; and
   wherein said microcontroller is programmed to modulate said intensity of said at least one light according to said intensity value by controlling said at least one light driver.

6. The vehicle of claim 5, wherein the second sensor comprises a capacitive sensing plate.

* * * * *